United States Patent [19]

Raufast

[11] Patent Number: 5,171,541
[45] Date of Patent: Dec. 15, 1992

[54] FLUIDIZED BED DISCHARGE PROCESS

[75] Inventor: Charles Raufast, Saint Julien les Martigues, France

[73] Assignee: BP Chemicals Limited, London, England

[21] Appl. No.: 701,606

[22] Filed: May 14, 1991

Related U.S. Application Data

[63] Continuation of Ser. No. 423,547, Oct. 13, 1989, abandoned, which is a continuation of Ser. No. 363,397, Jun. 5, 1989, abandoned, and a continuation of Ser. No. 59,110, Jun. 8, 1989, abandoned.

[30] Foreign Application Priority Data

Jun. 16, 1986 [FR] France .................. 86 08664

[51] Int. Cl.$^5$ ............................. F27B 15/08
[52] U.S. Cl. ......................... 422/145; 414/217; 414/221; 414/287; 414/292; 414/786; 526/88; 422/233
[58] Field of Search .......... 422/232, 233, 145; 414/219, 221, 217, 287, 292, 786; 526/62, 88; 251/304

[56] References Cited

U.S. PATENT DOCUMENTS

| | | | |
|---|---|---|---|
| 2,985,324 | 5/1961 | Balentine | 414/217 |
| 3,179,471 | 4/1965 | Savage | 414/217 |
| 3,463,617 | 8/1969 | Takeuchi | 422/311 |
| 3,729,105 | 4/1973 | Huebler et al. | 414/221 X |
| 3,869,807 | 11/1975 | Perry | 34/33 |
| 3,914,449 | 10/1975 | McPhail | 414/221 X |
| 3,951,380 | 4/1976 | Oliva-Bonino | 251/304 |
| 4,003,712 | 1/1977 | Miller | 422/131 X |
| 4,193,580 | 3/1980 | Norris et al. | 251/304 X |
| 4,261,705 | 4/1981 | Li | 414/217 X |
| 4,326,672 | 4/1982 | Goloff | 239/91 |
| 4,555,385 | 11/1985 | Stone | 422/233 |

FOREIGN PATENT DOCUMENTS

| | | |
|---|---|---|
| 071430 | 2/1983 | European Pat. Off. |
| 173261 | 3/1986 | European Pat. Off. |
| 202076 | 11/1986 | European Pat. Off. |
| 2024158 | 9/1980 | United Kingdom |

*Primary Examiner*—Robert J. Warden
*Assistant Examiner*—Krisanne Thornton
*Attorney, Agent, or Firm*—Brooks Haidt Haffner & Delahunty

[57] ABSTRACT

Process for discharging solid particulate products present in a fluidized bed reactor in which the polymerization or copolymerization of alpha-olefins is carried out, in a system consisting of a vessel connected to the reactor by way of a pipe provided with a first valve and connected to a reservoir situated downstream by way of a pipe provided with a second valve, the said method being characterized in that:

the two valves consist of continuously rotating plug, valves, these valves being moved in such a way that the two valves are not open at the same time, even partly, and the volume of the vessel comprises between 1/10 and 1/000, and preferably between 1/100 and 1/500 of the volume of fluidized solid contained in the reactor.

11 Claims, No Drawings

FLUIDIZED BED DISCHARGE PROCESS

This is a continuation of application Ser. No. 07/423,547, filed Oct. 13, 1989, now abandoned, which is a continuation of Ser. No. 07/363,397, filed Jun. 5, 1989, now abandoned, and a continuation of Ser. No. 07/059,110, filed Jun. 8, 1989, now abandoned.

The present invention relates to a process for removing products present in a reactor used for the polymerization and/or copolymerization of olefins in a fluidized bed.

It is known that polymerization of alpha-olefins, containing 2-12 carbon atoms for example ethylene, propylene and 1-butene can be carried out in the gaseous phase in the presence of a catalytic composition comprising, for example, (a) a solid compound of a transition metal of sub groups IVa, Va and VIa of the Periodic Classification of the Elements, preferably titanium, this compound also optionally containing magnesium and (b) one or more organometallic compounds of a metal in Groups I, II or III of the Periodic Classification, preferably an organoaluminium compound.

It is also known that polymerization, or copolymerization of alpha-olefins can be carried out by using the catalysts described above, or similar catalysts, by a fluidized bed technique. This operation is generally carried out in a vertical reactor in which the granules of polymer being formed are maintained in a fluidized state by means of an ascending flow of gas containing the olefin or olefins to be polymerized. Such a reactor is usually equipped, in its lower portion, with a perforated or porous plate—hereafter called a fluidization grid—which enables the flow of gas introduced under the grid to be distributed in the reactor, and maintains the particles of polymer in a fluidized state above the grid. A side tube situated above the grid enables part of the polymer contained in the reactor to be removed intermittently or continuously.

It is known that material can be discharged from the polymerization reactor by means of apparatus comprising an intermediate vessel connected to the reactor by means of pipework and connected to a receiver situated downstream also by means of pipework. Each of these sets of pipework is provided with a valve. These valves are operated sequentially in such a manner that the assembly operates like an air-lock, one part of the gas and polymer present in the reactor passing into the intermediate vessel and then into the receiver.

It has been observed in industrial practice that operation of the valves leads to substantial pressure fluctuations in the reactor. Whilst it has been found that the magnitude of the pressure fluctuations can be reduced to some extent by using an intermediate chamber having a smaller volume, it then becomes necessary to increase the frequency and speed of the valve operation to accommodate the same discharge rate of the polymer particles from the reactor. However it has been found in practice that increasing the frequency and the speed of valve operation leads to the discharge of material containing an undesirably higher ratio of monomer to polymer. This in turn leads to the necessity to recompress larger quantities of the unreacted monomeric gases before recycling them to the reactor. Moreover, it has been observed that the moving parts of the valves wear rapidly, leading to substantial losses of monomer through leakage. These factors detract from the economy and safety of the gas fluidized bed polymerization process.

It has now been found that these disadvantages may be effectively reduced using the process of the invention.

The present invention provides a process for operating known apparatus for discharging solid particulate polyolefin product from a reactor wherein gas-fluidized bed polymerization of one or more alpha-olefins is carried out, the apparatus comprising a vessel connected to the reactor by means of a pipe provided with a first valve and connected to a receiver situated downstream by means of a pipe provided with a second valve, the said process being characterized in that:
the valves are continuously rotated valves, the rotation of these valves being related with each other in such a way that the two valves do not open at the same time, even partly, and
the volume of said vessel comprises between 1/10 and 1/1000, preferably between 1/100 and 1/500, of the volume of fluidized solid contained in the reactor.

By preference, the valves are a known type of plug valve with passages provided in the plugs of the valves which are straight with an axis perpendicular to the axis of rotation of the valves advantageously, these passages are cylindrical in shape, with a circular base.

The solid present in the fluidization reactor is generally in the form of particles having dimensions between 0.1 mm and 5 mm and a mean dimension preferably between 0.5 mm and 1.5 mm. The dimensions of the orifices of the passages passing through the plugs of the valves are greater than the dimensions of the largest particles of the solid contained in the reactor. These dimensions are preferably between 2 and 200 times the dimensions of the largest particles of solid contained in the reactor and more preferably between 5 and 50 times.

Also by preference, the dimensions of the orifices of the passages passing through the plugs of the valves are equal to or smaller than 0.35D, D being the mean exterior diameter of the plug.

Advantageously, the valves are chosen as being valves with a spherical plug turning inside a housing, the gas-tightness between the plug and the housing being assured by two seals or by two mechanical packings.

The speed of rotation of the valves may lie between, for example, 0.5 and 10 revolutions per minute, and the linear speed of the periphery of the plug may advantageously lie between 1 and 20 m/s.

It should be noted that short cycles may be chosen without any inconvenience, which enables a reduction in the volume of the vessel for a particular flow of solid. It has been observed, in fact, that even when the valves are turned in a relatively rapid way, the vessel is filled in a satisfactory manner, without causing an excessive flow of gas to take place from the reactor to the vessel.

The desired rotation of the valves may be brought about by any known technique, particularly a mechanical or electrical one. Preferably, the valves are moved at the same speed, their opening being out of phase by 90°. This is advantageously carried out by driving the two valves by a single, variable speed, motor.

As conventional, the vessel is connected to the reactor at a level situated below the upper part of the fluidized bed. In the case that the reactor contains a fluidization grid, this level is preferably situated above the grid at one or more points between the said grid and the lower third or most preferably, the lower quarter of the fluidized bed.

In the process of the invention for discharging solid particulate polyolefin product from a gas-fluidized bed polymerization reactor, wherein the gas pressure in the reactor is higher than that in the downstream receiver, said process comprises the following sequential cycle of operations as the valves undergo continuous rotation;

A. both valves are at their fully closed position;
B. the first valve opens progressively to admit solid particulate product and gas from reactor into vessel, the second valve remaining closed;
C. the first valve closes, the second valve remaining closed;
D. the second valve opens progressively so that solid particulate product and gas discharges from the vessel into the receiver situated downstream, the first valve remaining closed;
E. the second valve closes and the first valve remains closed and cycle resumes at step A.

The polymerization reactor is preferably in continuous operation under a pressure higher than the pressure existing in the receiver situated downstream, and the valves are continuously rotated. At the start of the cycle, the valves are both closed. As the cycle proceeds, the first valve opens progressively, whilst the second valve remains closed. By reason of the pressure difference existing between the reactor and the vessel, the latter is filled from part of the fluidized bed contained in the reactor. The first valve closes progressively, and when it is entirely closed, the second valve proceeds to open, thus causing discharge of solid and gas present in vessel to the receiver situated downstream, under the influence of the difference in pressure between the vessel and the receiver. The second valve closes progressively whilst the first valve remains closed and the cycle is then reproduced in the same way.

The speed of rotation of the valves may lie between, for example, 0.5 and 10 revolutions per minute, and the linear speed of the periphery of the plug may advantageously lie between 1 and 20 m/s.

Preferably, the length of time that the first valve is open is sufficiently long for the pressure existing in the vessel at the end of the filling up of the latter to be approximately equal to the pressure existing in the reactor, such that the vessel is entirely filled from the fluidized bed.

In a similar manner, the length of time that the second valve is open is preferably sufficiently long for the pressure existing in the vessel at the end of the period of emptying of the latter, to be approximately equal to the pressure existing in the receiver downstream, such that the vessel is emptied completely of the particulate solid it contains.

It has been observed that the process of the invention operates in a satisfactory manner even when the difference in pressure between the reactor and the downstream receiver is low. Generally, this difference in pressure lies between 0.1 MPa and 5 MPa and more frequently between 1 and 3 MPa. The process may equally well be applied to the emptying of a polymerization reactor working discontinuously, or to the partial or total emptying of a polymerization reactor working continuously, when it is desired, for example to modify the quality of the polymer produced in the polymerization reactor. The same process may also be used for emptying a polymerization reactor in which polymerization has been interrupted by replacement of the fluidizing gas, containing one or more alpha-olefins, by a nonreactive gas such as nitrogen.

The process of the present invention are suitably used in homopolymerization or in copolymerization of alpha-olfins.

The following, non-limiting example illustrates the invention.

An ethylene polymerization reactor working at 2 MPa absolute contains a bed of polymer in a fluidized state at a concentration of 200 Kg/m$^3$. This polymer bed consists of solid particles whose mean dimension is 0.75 mm, 90% of these particles having a dimension lying between 0.2 and 1.3 mm.

The reactor is equipped with a 100 liter vessel and first and second valves and provided with spherical plugs 150 mm in diameter, having a cylindrical passage 50 mm in diameter. The valves turn continuously at 2 revolutions per minute. At each revolution, 25 Kg of polymer pass into the vessel, then into the receiver connected to the second valve; this receiver being at a pressure of 0.12 MPa absolute. After one year of substantially continuous operation, corresponding to about a million cycles, no wear liable to cause any appreciable loss of gas-tightness was observed on the valves, whilst a similar apparatus equipped with identical valves operating in a discontinuous manner showed appreciable wear on the valve seals and a substantial loss of gas-tightness after only 50000 cycles.

I claim:

1. In a process for discharging solid particulate polyolefin product from a gas-fluidized bed polymerization reactor in which the reactor is connected to a vessel through a first valve which is openable and closable, the vessel is connected to a receiver by a second valve which is openable and closable and the gas pressure in the reactor is higher than that in said receiver, wherein the improvement comprises said first and second valves being openable and closable by rotation and simultaneously and continuously rotating said first valve and said second valve at a speed of rotation between 0.5 and 10 revolutions per minute and sot hat the following sequential cycle of operations is obtained as the valves are continuously rotated;

A. in part of their continuous rotation, both valves are at their fully closed position;
B. in part of their continuous rotation, the first valve opens progressively to admit solid particulate product and gas from said reactor into said vessel, while the second valve is still closed;
C. in part of their continuous rotation, the first valve closes, and the second valve remains closed;
D. in part of their continuous rotation, the second valve opens progressively so that solid particulate product and gas discharges from said vessel into said receiver, and the first valve remains closed; and
E. in part of their continuous rotation, the second valve closes and the first valve remains closed and the cycle resumes at step A.

2. Process claimed in claim 1 wherein the speed of rotation of said first valve is the same as the speed of rotation of said second valve.

3. In a process for discharging a mixture comprising a reactive monomeric gas and solid particulate polyolefin product from a gas-fluidized bed polymerization reactor in which the reactor is connected to a vessel through a first valve which is openable and closable, said first valve in its open condition permitting the free flow of said product from said reactor to said vessel and in its closed position preventing the flow of said product from said reactor to said vessel, the vessel is connected to a receiver by a second valve which is openable and closable, said second valve in its open condition permitting the free flow of said product from said vessel to said receiver and in its closed position preventing the flow of said product from said vessel to said receiver, and the gas pressure in the reactor is higher than that in said receiver, wherein the improvement comprises said first and second valves each being openable to the open condition thereof and closable to the closed condition thereof with rotation in a single direction and simultaneously and continuously rotating said first valve and said second valve so that the following sequential cycle of operations is obtained as the valves are continuously rotated;

- A. in part of their continuous rotation, both valves are at their fully closed position;
- B. in part of their continuous rotation, the first valve opens progressively to admit solid particulate product and gas from said reactor into said vessel, while the second valve is still closed;
- C. in part of their continuous rotation, the first valve closes, and the second valve remains closed;
- D. in part of their continuous rotation, the second valve opens progressively so that solid particulate product and gas discharges from said vessel into said receiver, and the first valve remains closed;
- E. in part of their continuous rotation, the second valve closes and the first valve remains closed and the cycle resumes at step A.

4. Process claimed in claim 3, such that the difference between the pressure in the reactor and the receiver downstream of it, lies between 0.1 MPa and 5 MPa.

5. Process as claimed in claim 3 wherein the speed of rotation of said first valve is the same as the speed of rotation of said second valve.

6. Process claimed in claim 3 wherein each of said first valve and said second valve has a housing with a rotatable spherical plug member and with a rectilinear passageway extending through the housing and the member and perpendicular to the axis of rotation of the member for respectively interconnecting said reactor with said vessel and said vessel with said receiver and wherein said first valve is rotated with the axis of its passageway disposed at 90° with respect to the axis of the passageway of said second valve.

7. Process claimed in claim 1 wherein said first valve and said second valve are rotated by a single drive motor.

8. Process claimed in claim 1, such that the difference between the pressure in the reactor and the receiver downstream of it, lies between 0.1 MPa and 5 MPa.

9. Process claimed in claim 1 wherein each of said first valve and said second valve has a housing with a rotatable spherical plug member and with a rectilinear passageway extending through the housing and the member and perpendicular to the axis of rotation of the member for respectively interconnecting said reactor with said vessel and said vessel with said receiver and wherein said first valve is rotated with the axis of its passageway disposed at 90° with respect to the axis of the passageway of said second valve.

10. Process claimed in claim 1 wherein said gas-fluidized bed has a predetermined volume of fluidized solid and wherein the volume of said vessel has a volume in the range from 1/10 to 1/1000 of the volume of said fluidized solid.

11. In a method comprising providing apparatus comprising a gas-fluidized bed reactor from which solid particulate is transferred from the reactor to a vessel through a first valve which is connected to said reactor and to said vessel and which is openable and closable and is transferred from the vessel to a receiver through a second valve which is connected to said vessel and to said receiver and which is openable and closable, the gas pressure in said reactor being higher than the gas pressure in said receiver, wherein the improvement comprises increasing the solid particulate transferred in a predetermined period of time from said gas-fluidized bed polymerization reactor to said vessel and hence to said receiver, by providing first and second valves each of which is openable to the open condition thereof and closable to the closed condition thereof with rotation in a single direction and simultaneously and continuously rotating said first valve and said second valve so that the following sequential cycle of operations is obtained as the valves are continuously rotated;

- A. in part of their continuous rotation, both valves are at their fully closed position;
- B. in part of their continuous rotation, the first valve opens progressively to admit solid particulate product and gas from said reactor into said vessel, while the second valve is still closed;
- C. in part of their continuous rotation, the first valve closes, and the second valve remains closed;
- D. in part of their continuous rotation, the second valve opens progressively so that solid particulate product and gas discharges from said vessel into said receiver, and the first valve remains closed;
- E. in part of their continuous rotation, the second valve closes and the first valve remains closed and the cycle resumes at step A.

* * * * *

UNITED STATES PATENT AND TRADEMARK OFFICE
CERTIFICATE OF CORRECTION

PATENT NO. : 5,171,541
DATED : December 15, 1992
INVENTOR(S) : CHARLES RAUFAST

It is certified that error appears in the above-identified patent and that said Letters Patent is hereby corrected as shown below:

In the Abstract, l. 12, "the volume of the vessel" should start a new paragraph

Col. 4, line 2, should read "non-reactive gas"

Col. 4, line 41, should read "and so that the"

Signed and Sealed this

Eighteenth Day of January, 1994

Attest:

BRUCE LEHMAN

Attesting Officer    Commissioner of Patents and Trademarks